US010844458B2

(12) United States Patent
Takarada et al.

(10) Patent No.: US 10,844,458 B2
(45) Date of Patent: Nov. 24, 2020

(54) VANADIUM RECOVERY METHOD, METHOD FOR PRODUCING ELECTROLYTIC SOLUTION FOR REDOX FLOW BATTERIES, VANADIUM RECOVERY DEVICE, AND DEVICE FOR PRODUCING ELECTROLYTIC SOLUTION FOR REDOX FLOW BATTERIES

(71) Applicants: National University Corporation Gunma University, Maebashi (JP); Nihon Kanki Industry Co., Ltd., Tokyo (JP); Sumitomo Electric Industries, Ltd., Osaka (JP); Kawasaki Jukogyo Kabushiki Kaisha, Kobe (JP)

(72) Inventors: Takayuki Takarada, Maebashi (JP); Naokatsu Kannari, Maebashi (JP); Tsutomu Nishide, Tokyo (JP)

(73) Assignees: National University Corporation Gunma University, Maebashi (JP); Nihon Kanki Industry Co., Ltd., Tokyo (JP); Sumitomo Electric Industries, Ltd., Osaka (JP); Kawasaki Jukogyo Kabushiki Kaisha, Kobe (JP)

( * ) Notice: Subject to any disclaimer, the term of this patent is extended or adjusted under 35 U.S.C. 154(b) by 266 days.

(21) Appl. No.: 15/743,838

(22) PCT Filed: Jul. 8, 2016

(86) PCT No.: PCT/JP2016/070342
§ 371 (c)(1),
(2) Date: Jan. 11, 2018

(87) PCT Pub. No.: WO2017/010437
PCT Pub. Date: Jan. 19, 2017

(65) Prior Publication Data
US 2018/0209014 A1      Jul. 26, 2018

(30) Foreign Application Priority Data

Jul. 15, 2015  (JP) ................................. 2015-141349

(51) Int. Cl.
*C22B 34/00*        (2006.01)
*C22B 34/22*        (2006.01)
(Continued)

(52) U.S. Cl.
CPC ................ *C22B 34/22* (2013.01); *C22B 3/06* (2013.01); *C22B 3/24* (2013.01); *C22B 3/44* (2013.01);
(Continued)

(58) Field of Classification Search
CPC ...... C22B 19/22; C22B 23/0407–0461; C22B 34/22; C22B 3/0098; C22B 3/44;
(Continued)

(56) References Cited

U.S. PATENT DOCUMENTS

2002/0112968 A1    8/2002  Shiroto et al.
2009/0158896 A1*   6/2009  Rossoni .................... B01J 45/00
                                                              75/744

FOREIGN PATENT DOCUMENTS

CN    101613127 A    12/2009
CN    104357660 A     2/2015
(Continued)

OTHER PUBLICATIONS

Chinese Office Action, dated Jun. 2019, 2019-062101690530 (Year: 2019).*

*Primary Examiner* — Steven J Bos
(74) *Attorney, Agent, or Firm* — The Webb Law Firm

(57) ABSTRACT

The present invention is characterized by comprising: an acid leaching step for obtaining a leach liquid by causing leaching of, by means of an acid, a metal mixture at least (Continued)

containing vanadium and at least one type of a divalent or trivalent metal selected from nickel, cobalt, manganese, palladium, platinum, copper, and zinc; a complex generation step for adding an ammoniacal alkaline aqueous solution to the leach liquid for adjusting the pH to 10-12 and generating, in the alkaline aqueous solution, an ammine complex of a divalent or trivalent metal ion and an anion complex of a tetravalent and/or pentavalent vanadium ion; a divalent or trivalent metal recovery step for adding a carrier having a carboxyl group to the alkaline aqueous solution in which the ammine complex and the anion complex are generated, causing the divalent or trivalent metal ion in the ammine complex to be selectively adsorbed onto the carrier, and recovering the divalent or trivalent metal ion; and a vanadium recovery step for recovering vanadium from the anion complex contained in the alkaline aqueous solution after the divalent or trivalent metal ion is recovered.

7 Claims, 5 Drawing Sheets

(51) Int. Cl.
*C22B 3/24* (2006.01)
*C22B 3/44* (2006.01)
*C22B 3/06* (2006.01)
*H01M 8/18* (2006.01)

(52) U.S. Cl.
CPC ...... *H01M 8/18* (2013.01); *H01M 2300/0011* (2013.01); *Y02P 10/20* (2015.11)

(58) Field of Classification Search
CPC .................. C22B 3/24; C22B 3/04–10; C22B 11/04–048; C22B 15/0065–0078; C22B 4/0054–0081; Y02P 10/234; H01M 8/18; H01M 2300/0011; C01G 31/00; C01G 31/02
USPC .......... 423/22, 27, 49, 68, 109, 150.1–150.6
See application file for complete search history.

(56) References Cited

FOREIGN PATENT DOCUMENTS

| CN | 104593605 A | | 5/2015 |
|---|---|---|---|
| EP | 2851443 A1 | | 3/2015 |
| JP | 5156375 A | | 6/1993 |
| JP | 9125171 A | | 5/1997 |
| JP | 2002187720 A | | 7/2002 |
| WO | 2010-057412 | * | 5/2010 |

* cited by examiner

Fig. 2
(a)
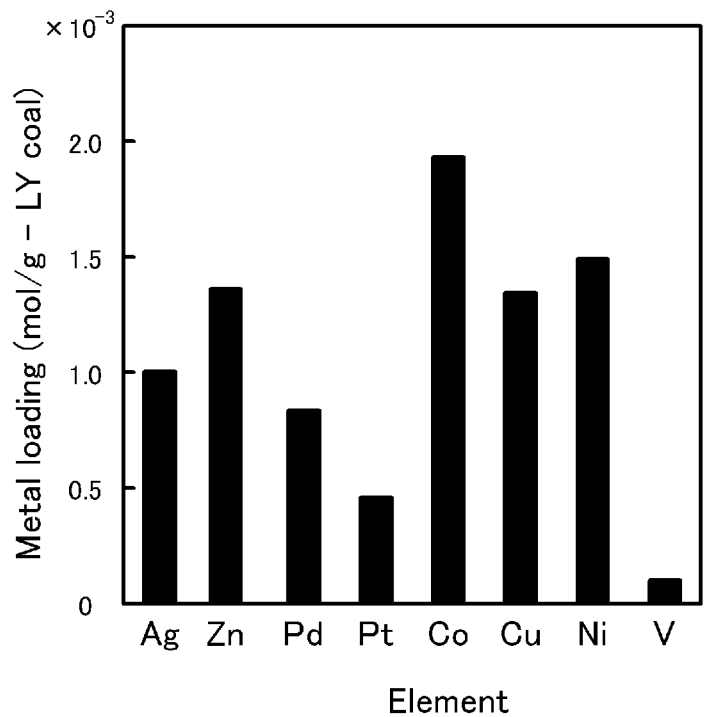
(b)
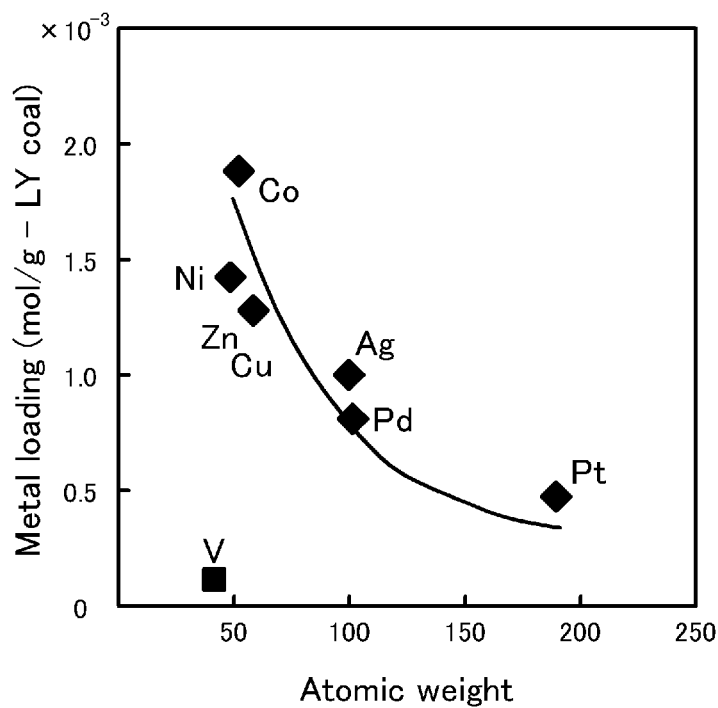

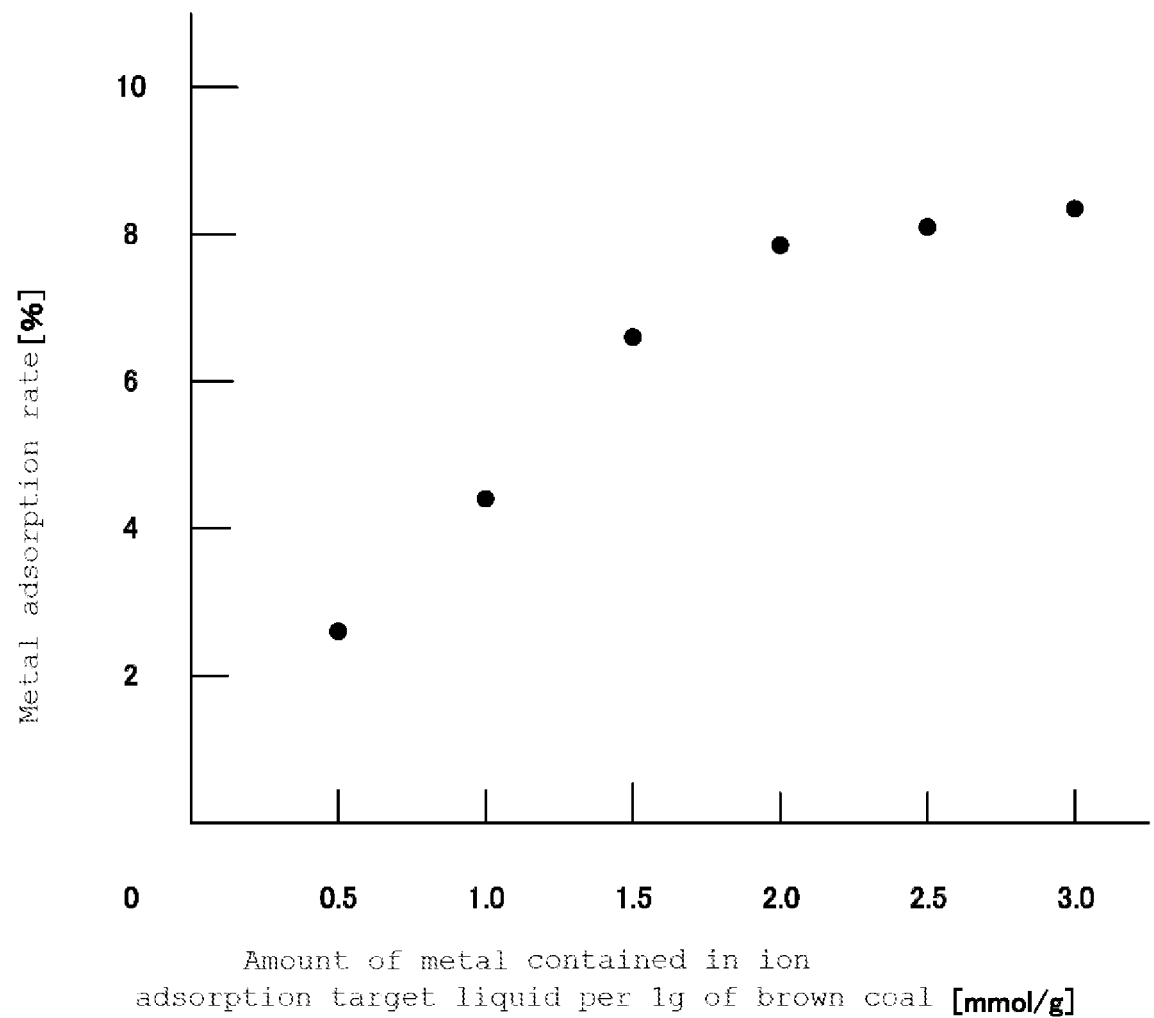

VANADIUM RECOVERY METHOD, METHOD FOR PRODUCING ELECTROLYTIC SOLUTION FOR REDOX FLOW BATTERIES, VANADIUM RECOVERY DEVICE, AND DEVICE FOR PRODUCING ELECTROLYTIC SOLUTION FOR REDOX FLOW BATTERIES

CROSS-REFERENCE TO RELATED APPLICATIONS

This application is the United States national phase of International Application No. PCT/JP2016/070342 filed Jul. 8, 2016, and claims priority to Japanese Patent Application No. 2015-141349 filed Jul. 15, 2015, the disclosures of which are hereby incorporated in their entirety by reference.

FIELD OF THE INVENTION

The present invention relates to a vanadium recovery method for selectively recovering vanadium from a plurality of valuable metals contained in an extracted ash derived from atmospheric distillation or reduced-pressure distillation, an incinerated boiler ash, a partially oxidized ash, a carbonblack-accompanying ash and a petroleum coke ash, waste catalysts of various types of chemical reaction catalysts, an industrial waste, a waste liquid, a vanadium slag and the like, a method for producing electrolytic solution for redox flow batteries, a vanadium recovery device, and a device for producing electrolytic solution for redox flow batteries.

BACKGROUND OF THE INVENTION

A plurality of metals such as vanadium (V), nickel (Ni), iron (Fe), and magnesium (Mg) are contained in various kinds of ashes derived from atmospheric distillation residual oil obtained by atmospheric distillation, reduced-pressure distillation residual oil obtained by reduced-pressure distillation, and an oil sand. Among these metals, vanadium is a variable metal and is a main constituent of redox flow batteries. Therefore, it is desirable that vanadium is largely supplied, and efficient recovery method of vanadium is established.

Conventionally, a leaching method, which recovers variable metals from a waste catalyst used in desulfurization and hydrogenation of a heavy oil, is known (for example, Patent literature 1). In the leaching method disclosed in Patent literature 1, after a waste catalyst is heated at a temperature of 300 to 400° C. and remove an oil content, it is subjected to oxidation roasting at a temperature of 350 to 450° C. in air, and the resulting roasted products is alkali-leached to obtain a leach liquid containing vanadium and further acid-leached to obtain a leach liquid containing nickel.

CITATION LIST

Patent Literature

Patent Literature 1: JP H05-156375

SUMMARY OF THE INVENTION

Technical Problem

In the leaching method disclosed in Patent literature 1, however, the temperature of heating and roasting is limited to the range of 300 to 450° C., and there is a problem that heating or roasting within the above-described temperature range is difficult since the oil content and carbon content in the waste catalyst vary depending on recovered objects and kinds of raw materials. Further, there is a problem that leaching rate (i.e., recovery rate) of vanadium or the like in the leaching step drops since vanadium, nickel, etc. is liable to form a compound with alumina within the high temperature range of heating or roasting. Furthermore, in the leaching method disclosed in Patent literature 1, alkali or acid is added to a metal mixture, whereby a target metal is recovered by difference in solubility to alkali or acid depending on kinds of metals. However, since such a method has a low selectivity to metal, recovery rate is liable to become low.

Further, in the leaching method disclosed in Patent literature 1, a vanadium content is recovered in the form of sodium vanadate by alkali leaching using caustic soda or sodium carbonate, and an unsoluble nickel content is recovered in the form of nickel chloride (or nickel nitrate, nickel sulfate) by acid leaching. In this case, in order to recover the vanadium content and the nickel content in the form of vanadium oxide ($V_2O_5$) and nickel oxide ($NiO/NiO_2$) respectively, which are developable to various uses, it is necessary to employ a chemical reaction process of multi steps. As a result, there is a problem that the recovery cost is high.

In consideration of the above-described problems of the prior art, it is an object of the present invention to provide a method for costly recovering vanadium with high recovery rate, a method for producing electrolytic solution for redox flow batteries, a vanadium recovery device, and a device for producing electrolytic solution for redox flow batteries.

Solution to Problem

According to a first aspect of the present invention, for solving the above-described problems, there is provided a method for recovering vanadium from a metal mixture at least containing vanadium and at least one kind of a divalent or trivalent metal selected from nickel, cobalt, manganese, palladium, platinum, copper and zinc, which comprises: an acid leaching step for leaching the metal mixture with an acid to obtain a leach liquid; a complex generating step for adding an ammoniacal alkaline aqueous solution to the leach liquid to adjust the pH to 10-12 and generating an ammine complex of a divalent or trivalent metal ion and an anion complex of a tetravalent and/or pentavalent vanadium ion in the alkaline aqueous solution; a divalent or trivalent metal recovery step for adding a carrier having a carboxyl group to the alkaline aqueous solution in which the ammine complex and the anion complex are generated, causing the divalent or trivalent metal ion in the ammine complex to be selectively adsorbed onto the carrier, and recovering the divalent or trivalent metal ion; and a vanadium recovery step for recovering vanadium from the anion complex contained in the alkaline aqueous solution after the divalent or trivalent metal ion is recovered.

According to the second aspect of the present invention, for solving the above-described problems, there is provided the method for recovering vanadium according to the above-described first embodiment, wherein the vanadium recovery step comprises adjusting the pH of the alkaline aqueous solution to 8 to 9.5 to precipitate the anion complex, filtration-separating the anion complex, and roasting the anion complex in air to recover vanadium oxide.

According to the third aspect of the present invention, for solving the above-described problems, there is provided the method for recovering vanadium according to the above-described first embodiment, wherein the vanadium recovery step comprises adjusting the pH of the alkaline aqueous solution to 8 to 9.5 to precipitate the anion complex, filtration-separating the anion complex, heating the anion complex in an atmosphere of nitrogen until an ammonia content in the anion complex evaporates, and adding sulfuric acid to recover tetravalent and/or pentavalent vanadium sulfate.

According to the fourth aspect of the present invention, for solving the above-described problems, there is provided the method for recovering vanadium according to the above-described first to third embodiments, wherein the carrier is brown coal.

According to the fifth aspect of the present invention, for solving the above-described problems, there is provided the method for producing an electrolytic solution for redox flow batteries, in which the vanadium recovered by the method according to the above-described first to third embodiments is used as a raw material for the electrolytic solution.

According to the sixth aspect of the present invention, for solving the above-described problems, there is provided a device for recovering vanadium from a metal mixture at least containing vanadium and at least one kind of a divalent or trivalent metal selected from nickel, cobalt, manganese, palladium, platinum, copper and zinc, which comprises: an acid leaching means for leaching the metal mixture with an acid to obtain a leach liquid; a complex generating means for adding an ammoniacal alkaline aqueous solution to the leach liquid to adjust the pH to 10-12 and generating an ammine complex of a divalent or trivalent metal ion and an anion complex of a tetravalent and/or pentavalent vanadium ion in the alkaline aqueous solution; a divalent or trivalent metal recovery means for adding a carrier having a carboxyl group to the alkaline aqueous solution in which the ammine complex and the anion complex are generated, causing the divalent or trivalent metal ion in the ammine complex to be selectively adsorbed onto the carrier and recovering the divalent or trivalent metal ion; and a vanadium recovery means for recovering vanadium from the anion complex contained in the alkaline aqueous solution after filtration separation.

According to the seventh aspect of the present invention, for solving the above-described problems, there is provided a device for producing an electrolytic solution for redox flow batteries, in which the vanadium recovered by the device according to the above-described sixth embodiment is used as a raw material for the electrolytic solution.

Advantage of the Invention

According to the present invention having the above-described configuration, it is possible to separate and efficiently recover vanadium from a plurality of valuable metals contained in an atmospheric distillation or reduced-pressure distillation residue oil, namely, from a metal mixture containing a divalent or trivalent metal and vanadium, using a simple operation including pH adjustment of an alkaline solution and addition of a carrier.

Further, in the pH range 10 to 12 of the alkaline solution in which the ammine complex having a divalent or trivalent metal ion and the anion complex having a tetravalent and/or pentavalent vanadium ion are generated, it is possible to cause the divalent or trivalent metal ion to be selectively adsorbed onto the carrier and recover it.

BRIEF DESCRIPTION OF DRAWINGS

FIG. 2 is a graph showing adsorption amounts of various metal ions onto brown coal.

FIG. 5 is a graph showing a relationship between an amount of metal [mmol/g] contained in an ion adsorption target liquid, per 1 g of brown coal, and metal adsorption rate.

DETAILED DESCRIPTION OF THE INVENTION

There will be described in detail a vanadium recovery method, a method for producing electrolytic solution for redox flow batteries, a vanadium recovery device, and a device for producing electrolytic solution for redox flow batteries, according to the present invention, with reference to Figures.

1. Recovery Method of Vanadium

Figure 1:
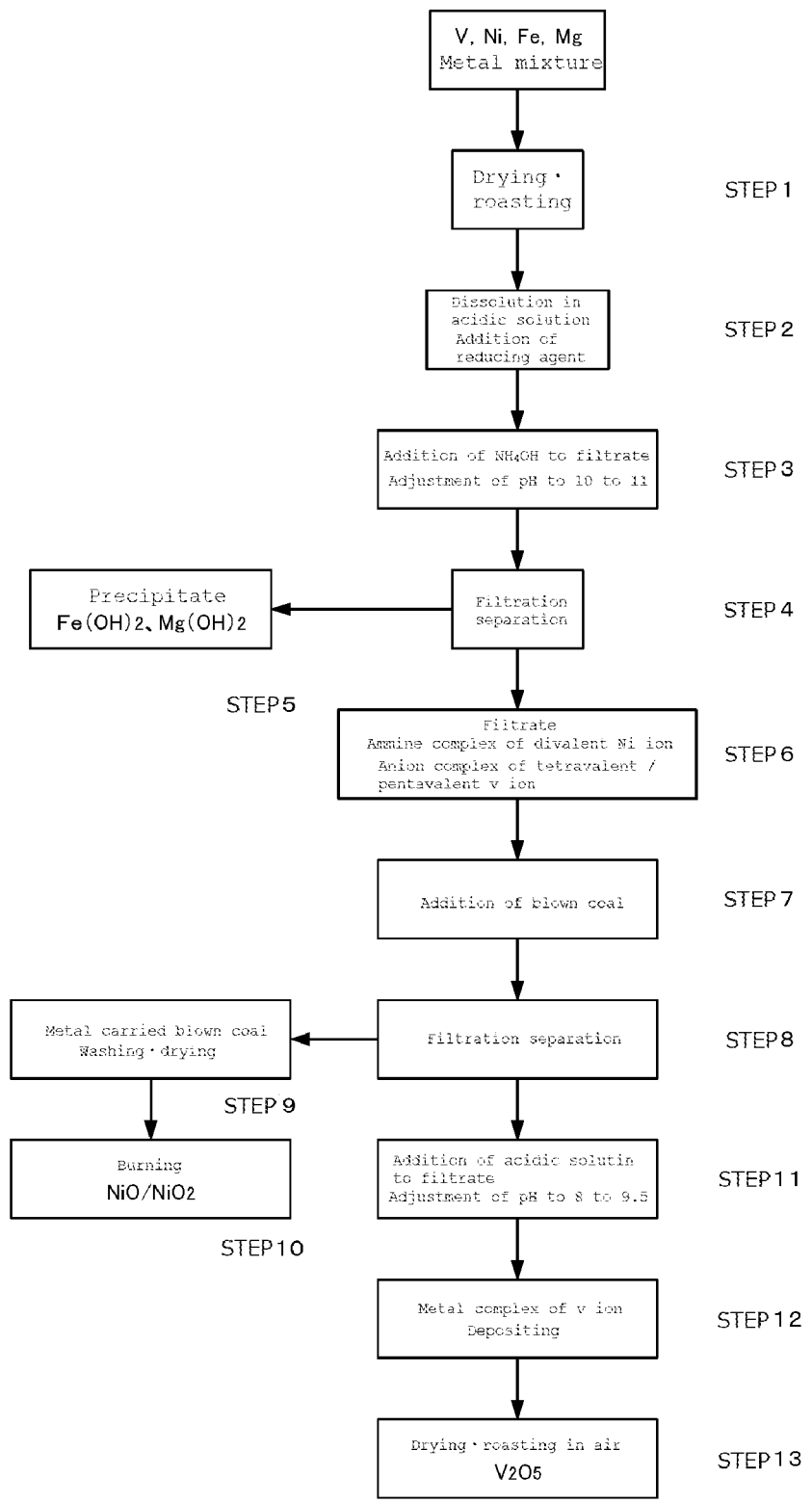
FIG. 1 is a process flow diagram showing a recovery method of vanadium according to the present invention.

FIG. 1 is a process flow diagram showing a recovery method of vanadium according to an embodiment of the present invention. Here, FIG. 1 shows an example using brown coal as one kind of carrier.

The selective recovery method of vanadium from a metal mixture according to the present invention can be applied to a metal mixture of a plurality of metals such as vanadium, nickel, iron and magnesium contained in an incinerated boiler ash derived from atmospheric distillation or reduced-pressure distillation, partially oxidized ash, petroleum coke ash, residue ash of oil sand, waste catalysts of various chemical reaction catalysts, industrial waste, waste liquid, or the like.

For example, the waste catalysts of petroleum refinery are the waste material of the catalysts to be added together with hydrogen to remove a sulfur content in petroleum refinery. Though the components of the catalysts are copper, zinc, palladium, platinum or the like, the waste catalysts contain vanadium, nickel, cobalt, copper, zinc, palladium, platinum, iron, phosphorous, sulfur or the like since a heavy oil contains vanadium, nickel or the like. In general, these metals are contained in the waste catalysts as the sulfides.

Further, a vanadium slag is formed by calcining a magnetite and contains vanadium, manganese, aluminum, iron, titanium, silicon, calcium, phosphorous or the like. In general, a large amount of these metals are contained in the vanadium slag as the oxides.

Furthermore, the other examples of the metal mixture include the metal mixture obtained from the above-mentioned residue ash or the like. These metal mixtures include one containing iron, manganese, molybdenum, cobalt, manganese, titanium or the like in addition to nickel and vanadium. The metal mixtures of the present embodiment comprise vanadium, nickel, iron, magnesium as one example. There will be described a method for selectively recovering nickel and vanadium from these metal mixtures as follows:

(Heating Oxidation Step)

At first, the metal mixture is dried to remove a water content, and roasted to remove an excess oil content and carbon component, thus performing heating oxidation treatment (step 1). The condition of roasting is not limited as long as the metal contained in the metal mixture is fully oxidized. For example, the roasting can be performed at a temperature of 800 to 1,000° C. for several tens of minutes to a few hours in air. Incidentally, the condition of step 1 is set so that pentavalent $V_2O_5$ is mainly generated as vanadium oxide.

(Acid Leaching Step)

Subsequently, acid is added to the metal mixture to resolve the metal contents. Though the acid to be added to the metal mixture includes for example, sulfuric acid, hydrochloric acid, nitric acid or the like, sulfuric acid or nitric acid is preferable in consideration of high solubility. The concentration of the acid to be added to the metal mixture can be appropriately determined depending on the kinds of the metals and impurities contained in the metal mixture. Where, for example, sulfuric acid is used as an acid, the concentration thereof preferably falls within 10 to 80 weight %. The acid leaching is carried out preferably in the presence of a reducing agent. The reducing agent includes ammonium sulfite, ammonium hydrogen sulfite, sulfurous acid gas, hydrazine, hydrogen peroxide, starch or the like.

Though the condition of the acid leaching is not limited, the acid leaching can be performed at a temperature of 100 to 250° C. for several tens of minutes to a few hours. After acid leaching, the leach liquid is filtered to remove the solid content, thus obtaining a filtrate. The method of filtration is not limited and includes sedimentation, precipitation or the like.

In this step, vanadium is dissolved as a tetravalent and/or pentavalent (mainly tetravalent) compound (step 2). In step 2, it is enough that the metal mixture at least containing nickel and vanadium is dissolved in the acidic solution. The acidic solution dissolving the metal mixture can be used irrespective of the kind and concentration thereof.

(Complex Generating Step)

Next, an ammoniacal alkaline aqueous solution is added to the resultant filtrate (leach liquid) to adjust pH, thus generating the complexes of nickel and vanadium, respectively (step 3). The ammoniacal alkaline aqueous solution includes, for example, ammonia water (ammonium hydroxide ($NH_4OH$). Though the concentration of the ammonia water to be added to the filtrate is not limited as long as the complex described later is fully generated, it is preferably 15 to 35 mass %, more preferably 20 to 30 mass %. Further, in this step, pH is adjusted to 10 to 12, more preferably 10 to 11. Where pH is adjusted to 10 to 12, it is possible to fully generate the complex as described later. The adjustment of pH can be carried out by addition of ammonia water.

This alkaline aqueous solution is subjected to filtration separation to separate into a filtration precipitate and a filtrate (step 4). The filtration precipitate is formed of hydroxide such as iron hydroxide, magnesium hydroxide or the like and is a colloidal solid component (step 5). In this step, iron and magnesium are separated from the metal mixture. In addition, a part of magnesium hydroxide is dissolved in the alkaline aqueous solution without generating complex.

On the other hand, the resultant filtrate is an alkaline aqueous solution and contains an ammine complex of a divalent or trivalent metal ion and an anion complex of a tetravalent and/or pentavalent vanadium ion (step 6). In one example, the ammine complex of a divalent or trivalent metal ion includes $(NH_4)_2Ni(SO_4)_2$ or the like. Furthermore, in one example, the anion complex of a tetravalent vanadium ion includes $(NH_4)_2V_2(OH)_6(SO_4)_2$ or the like.

(Nickel Recovery Step)

A carrier having a carboxyl group is added to the alkaline aqueous solution and the mixture is agitated for a predetermined time to cause a nickel ion to be adsorbed onto the carrier by an ion adsorption (ion exchange) reaction between the nickel ion in the ammine complex and the carboxyl group in the carrier (step 7). It can be estimated that the mechanism, in which the carboxyl group adsorbs the nickel ion, is based on the following reaction formula.

$$2COOH + Ni^{2+} \rightarrow COO-Ni-OOC + 2H^+$$

The carrier having the carboxyl group is not limited as long as it causes the adsorbing reaction with nickel in the ammine complex. The carrier includes an artificially-synthesized ion exchange resin and a natural ion adsorbing carrier or the like.

Incidentally, where nickel adsorbed onto the carrier is recovered, it is preferred that the carrier containing the nickel ion is burned whole to recover nickel as a nickel oxide in consideration of recovery efficiency of nickel and regeneration of nickel. From this point, the carrier containing carbon, hydrogen and oxygen as main components is preferably used. The reason is that when such a carrier is used, the carrier adsorbing nickel is burned to form carbon dioxide and water which can be removed as gases such as carbon dioxide and steam, thus enabling to efficiently recover only solid nickel oxide. "Carrier containing carbon, hydrogen and oxygen as main components" referred to here means the carrier containing at least 95 mass % of the total of carbon, hydrogen and oxygen based on the total mass of the carrier, and it may contain trace elements such as nitrogen, sulfur or the like as a balance. Further, the amounts of carbon, hydrogen and oxygen contained in the carrier are preferably at least 98%, more preferably at least 99%.

The carrier containing carbon, hydrogen and oxygen as main components includes natural coal or the like. Low-grade coal having a relatively low carbon content is preferably used as coal in consideration of a low cost and high availability. The low-grade coal includes, for example, sub-bituminous coal, brown coal, lignite, and peat.

The sub-bituminous coal includes Pacific coal produced in Japan, Buckskin coal produced in U.S.A., Tanitoharumu coal produced in Australia, or the like. The brown coal includes Loy Yang brown coal produced in Australia, Knsk-Achinsk brown coal produced in Russia, Fortuna brown coal produced in Germany, brown coal produced in Indonesia, or the like. The blown coal is preferred among the low-grade coals because it has a high adsorbing capacity due to much carboxyl groups contained therein and is highly combustible due to high carbon content, in addition to a low cost and high availability.

When the brown coal has a high ash content, it is subjected to deashing to obtain ash content of less than 1% and the deashed brown coal is crushed to control the particle size to 45-75 μm. Thus, a large surface area for adsorbing nickel can be secured. The excess ash content for nickel recovery can be lowered in the combustion step of the brown coal.

Further, regarding the addition amount of the brown coal, the brown coal is preferably added such that the 1 g of the blown coal is added to the alkaline aqueous solution containing nickel of 2.0 mmol or more as described in the following Examples so as to efficiently recover nickel due to high metal carrying rate of the carrier. Where the brown coal is added in such an addition rate, a high nickel adsorbing capacity of 8% is represented and a recovery efficiency of nickel can be enhanced.

PH of the alkaline aqueous solution is preferably 10 to 12, more preferably 10 to 11. Where the pH falls within the range of 10 to 12, nickel ions can be largely and selectively recovered from the mixed solution of vanadium and nickel since the adsorption of nickel ions onto the brown coal occurs preferentially over the adsorption of vanadium ions onto the brown coal.

Subsequently, the alkaline aqueous solution is subjected to filtration separation (step 8). The carrier adsorbing nickel ions, which becomes a precipitate, is washed and dried (step 9). Extraction of nickel from the carrier adsorbing nickel ions is carried out by burning the whole carrier (step 10). Thus, nickel can be recovered in the form of nickel oxide (NiO/NiO$_2$). When an acidic solution such as sulfuric acid or the like is added to the carrier adsorbing nickel ions in step 9 and washed to generate nickel sulfate. This nickel sulfate can be also recovered. The washed carrier can be reused as an adsorbing material.

(Vanadium Recovery Step)

On the other hand, the anion complex containing mainly tetravalent vanadium ion is dissolved in the resultant filtrate (alkaline aqueous solution). An acidic solution is added to this alkaline aqueous solution to adjust pH to the range of 8 to 9.5 (step 11). For example, sulfuric acid can be employed as an acidic solution. Thus, the anion complex containing mainly tetravalent vanadium ion is precipitated and deposited (step 12).

The colloidal precipitate obtained by filtration separation of the alkaline aqueous solution are an anion complex containing mainly tetravalent vanadium ions. The colloidal precipitate is dried in air to remove a water content and are heated at a temperature of 500° C. or higher to dissociate ammonia ions and sulfate ions, followed by roasting-oxidizing the precipitate to recover vanadium in the form of vanadium oxide (V$_2$O$_5$) (step 13). It is possible to add lime to the aqueous solution from which the anion complex is separated, to recover an ammonia gas and reuse ammonium hydroxide derived from the ammonia gas to adjustment of pH in step 3. On the other hand, the sulfate ions are deposited and recover in the form of calcium sulfate.

The metal absorbable onto the above-described carrier other than nickel include a monovalent to trivalent metal ion which forms an ammine complex by addition of an ammoniac alkaline aqueous solution. Such a metal includes copper (Cu), zinc (Zn), silver (Ag), palladium (Pd), platinum (Pt), rubidium (Rb), gold (Au), ruthenium (Ru), palladium (Pd), cobalt (Co), manganese (Mn), or the like. The compound containing such a metal includes an oxide or sulfite of the metal.

FIG. 2 is a graph showing adsorption amounts of various metal ions onto brown coal, in which (a) is a graph showing the adsorption amounts onto brown coal, and (b) is a graph plotting a relationship between the atomic weights of metals and the adsorption amounts. In FIG. 2 (a), metals other than vanadium (tetravalent and/or pentavalent) are monovalent to trivalent metals, and each represents a larger adsorption amount onto brown coal relative to that of vanadium. This shows that these metal ions and vanadium are selectively separated by using brown coal as a carrier.

Further, FIG. 2 (b) shows that the smaller atomic weight of monovalent to trivalent metal ions, the larger adsorption amount they represent. This shows that a metal such as cobalt, nickel, zinc and copper, which has relatively small atomic weight, represents a large adsorption amount onto brown coal and it has an excellent selective separability from vanadium.

Also, the metal other than the metals shown in FIG. 2 can be separated from vanadium by forming ammine complex of the metal and adsorbing the complex onto the carrier. It is assumed that, for example, manganese (Mn), which is a divalent metal ion, represents better adsorption onto the brown coal relative to the metals as shown in FIG. 2(b) since atomic weight of manganese is as relatively small as 55.

Depending on kinds of metals, they can be separated and removed by the method other than that using brown coal. For example, in the case of zirconium (Zr), since zirconium does not form complex though it is soluble in sulfuric acid, ammonia is added to form hydroxide deposited in pH 8-9. The deposited hydroxide is separated to remove zirconium. Specifically, zirconium oxide (ZrO$_2$) is dissolved in an excess amount of hot sulfuric acid to form water-soluble zirconium sulfate (Zr(SO$_4$)$_2$). Subsequently, zirconium sulfate is reacted with an ammonia water to generate white colloidal precipitate according to the following reaction formula. Thus, even if zirconium and vanadium are mixed, zirconium can be separated from the mixture.

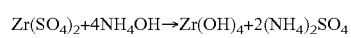

Modified Example 1

Figure 3:
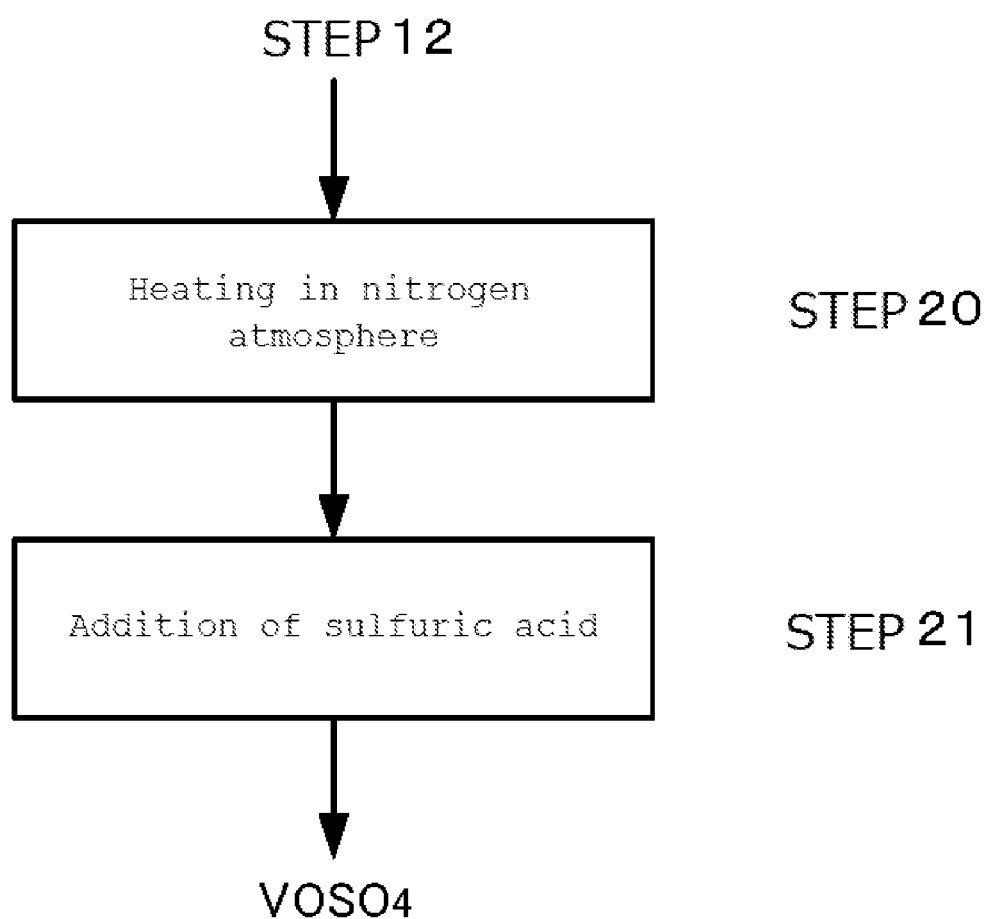
FIG. 3 is a process flow diagram showing a recovery method of vanadium according to Modified Example 1.

FIG. 3 is a process flow diagram showing a recovery method of vanadium according to Modified Example 1. It should be noted that FIG. 3 shows steps from step 12 onward. Since the previous steps are same as those shown in FIG. 1, the detailed description is omitted.

In FIG. 3, the precipitate after step 12 contains as a main component an anion complex of mainly tetravalent vanadium ion.

The precipitate is heated in an atmosphere of nitrogen (N$_2$) (step 20). In heating up to 400° C., ammonium ions in the anion complex and a part of sulfate ions (SO$_4$) are sequentially vaporized to become a mixed state of vanadium ions and sulfate ions.

Subsequently, sulfuric acid (H$_2$SO$_4$) is added to the mixture (step 21). By the addition of the sulfuric acid, vanadium sulfate (VOSO$_4$) is generated and can be recovered.

Incidentally, lime is added to the aqueous solution from which anion complex is separated, to recover ammonia gas. Ammonium hydroxide derived from this ammonia gas can be reused for pH adjustment in step 3 described above. On the other hand, the ammonium ions can be deposited and recovered in the form of calcium sulfate.

Modified Example 2

Figure 4:
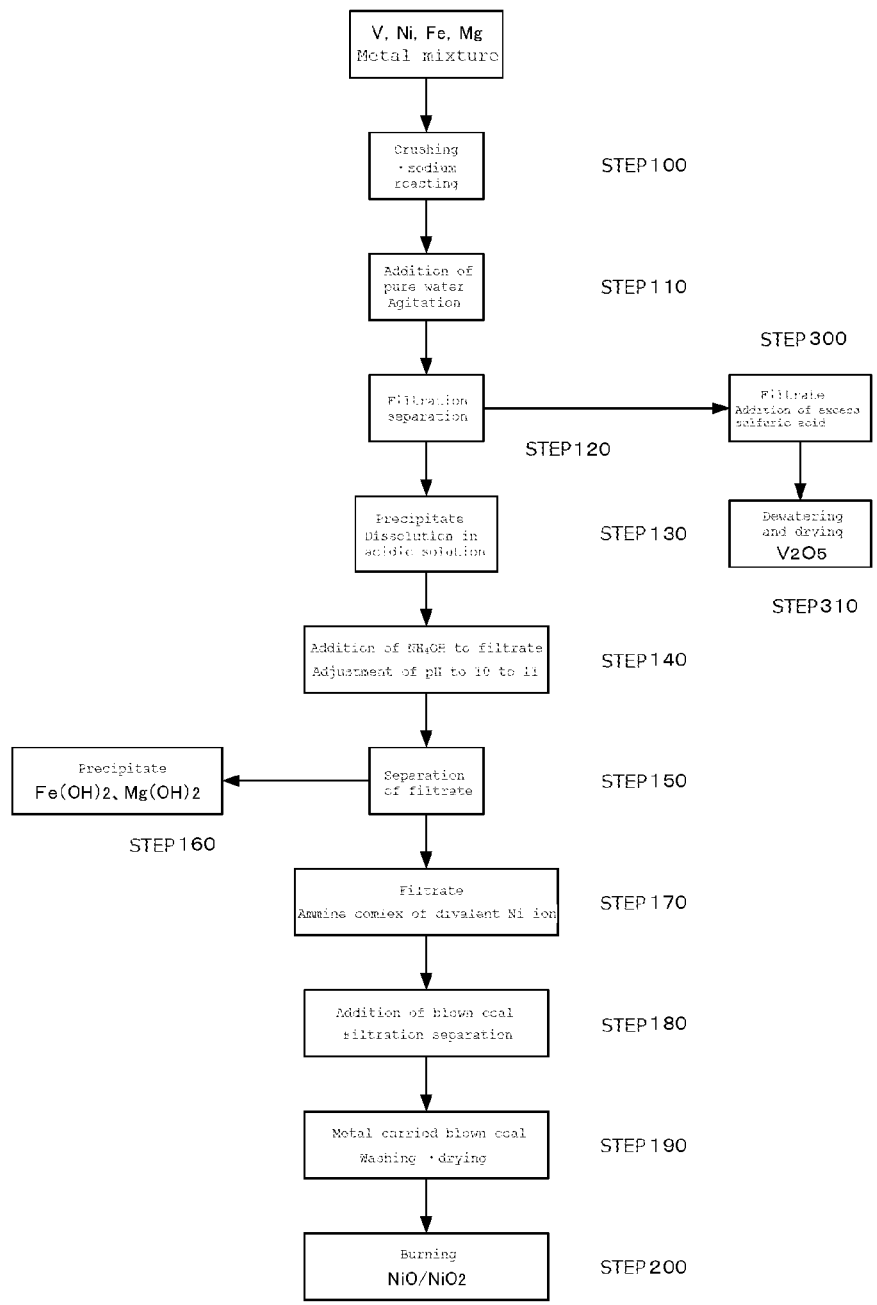
FIG. 4 is a process flow diagram showing a recovery method of vanadium according to Modified Example 1.

FIG. 4 is a process flow diagram showing a recovery method of vanadium according to Modified Example 2. The metal mixture obtained from the above-described residue ash or the like is crushed to a predetermined size and sodium carbonate (Na$_2$CO$_3$) is added thereto, followed by sodium roasting at a prescribed temperature (step 100).

After sodium roasting, the roasted mass is cooled and pure water is added thereto, followed by agitating (step 101). Sodium vanadate (NaVO$_3$) is dissolved in pure water, and nickel sulfide (NiS), nickel oxide (NiO), and the other metal oxide, which are insoluble, are deposited.

The aqueous solution is subjected to filtration separation (step 120), and an acidic solution, for example, hot sulfuric acid is added to the metal mixture except deposited vanadium to dissolve it followed by filtration-separating insoluble impurities (step 130).

Ammonium hydroxide (NH$_4$OH) is added to the resultant filtrate to adjust pH to 10-12, more preferably 10-11 (step 140).

This alkaline aqueous solution is subjected to filtration separation (step 150). The filtered precipitates are formed of hydroxide such as iron hydroxide and magnesium hydroxide (step 160).

On the other hand, the metal contained in the resultant filtrate is only the ammine complex of divalent nickel ions (step 170).

A carrier is added to the alkaline aqueous solution and the mixture is agitated for a predetermined time to adsorb nickel ions onto the carrier by ion adsorption reaction between the nickel ions in the ammine complex and the carboxyl group in the carrier (step 180).

Subsequently, the alkaline aqueous solution is subjected to filtration separation. The carrier adsorbing nickel ions, which is a precipitate, is washed and dried (step 190). Extraction of nickel from the carrier adsorbing nickel ions is carried out by burning the whole carrier. Thus, nickel can be recovered in the form of nickel oxide ($NiO/NiO_2$) (step 200). When an acidic solution such as sulfuric acid is added to the carrier adsorbing nickel ion in step 190 to wash it, nickel sulfate is generated. This nickel sulfate can be also recovered. The washed carrier can be reused as an adsorbing material.

An excess amount of sulfuric acid is added to the above-described aqueous solution of sodium vanadate (step 300) to precipitate vanadium oxide ($V_2O_5$), followed by washing and drying the precipitate (step 310). The sulfuric acid aqueous solution containing sodium sulfate is subjected to neutralization treatment using lime or the like.

Thus, according to the vanadium recovery method of the present invention, vanadium can be separated and efficiently recovered from a plurality of valuable metals contained in the atmospheric distillation or reduced-pressure distillation residue oil using a simple operation including pH adjustment of an alkaline solution and addition of the carrier at a normal temperature.

Furthermore, a nickel ion, which is a divalent metal ion, can be selectively adsorbed to a carrier and recovered in a range of pH 10 to pH 12, more preferably pH 10 to pH 11 of an alkaline aqueous solution in which an ammine complex of a divalent vanadium ion and an anion complex of a mainly tetravalent vanadium ion are generated.

2. Method for Producing Electrolytic Solution for Redox Flow Batteries

There is provided a method for producing an electrolytic solution for redox flow batteries which employs vanadium recovered by the above-described recovery method as a raw material of an electrolytic solution for redox flow batteries, in addition to the above-described recovery method of vanadium. With regard to the electrolytic solution for redox flow batteries, vanadium oxide sulfate (IV) is used for an electrolytic solution on a positive electrode and vanadium sulfate (II) is used for an electrolytic solution on a negative electrode. The concentration of vanadium contained in the electrolytic solution for redox flow batteries is not limited. However, it can fall within, for example, 0.1 mol/l to 10 mol/l, preferably 1 mol/l to 3 mol/l in each electrolytic solution on both the positive electrode and negative electrode.

With regard the production of vanadium sulfate (IV) which is a raw material for the electrolytic solution on the positive electrode, $VOSO_4$ obtained in step 21 can be used as it is. The method for producing vanadium sulfate (II) which is a raw material for the electrolytic solution on the negative electrode, includes for example, generating ammonium metavanadate from $V_2O_5$ obtained in step 13 shown in FIG. 1, decomposing the ammonium metavanadate at a high temperature in a nitrogen atmosphere to generate oxide ($V_2O_3$), and applying a high-pressure reaction process or atmospheric pressure process to the resultant oxide to obtain vanadium sulfate (II). The high-pressure reaction process is a method in which a concentrated sulfuric acid of 5 to 40% is added to $V_2O_3$ at a temperature of 250° C. at 40 atmospheric pressure to dissolve and precipitate vanadium sulfate in the concentrated sulfuric acid, thus obtaining vanadium sulfate (II). On the other hand, the atmospheric pressure process is a method in which a concentrated sulfuric acid of 80% is added to $V_2O_3$ at a temperature of 250° C. at 1 atmospheric pressure to dissolve and precipitate vanadium sulfate in the concentrated sulfuric acid of 80%, followed by dissolving vanadium sulfate in a diluted sulfuric acid of less than 50%, and thus obtaining vanadium sulfate (II).

3. Device for Recovering Vanadium

A device for recovering vanadium according to the present invention can be constructed as a device for performing the above-described recovery method. One example of the recovery device according to the present invention can take the form of a recovery system (plant etc.) including an acid leaching tank, a complex generating tank, a nickel recovery tank, and a vanadium recovery tank.

The acid leaching tank is a means for leaching a metal mixture containing at least vanadium with an acid to obtain a leach liquid and corresponds to an acid leaching means of the present invention. In the acid leaching tank, an acid leaching is carried out according to the above-mentioned method described in step 2.

The complex generating tank is a means for adding an ammoniacal alkaline aqueous solution to the leach liquid obtained in the acid leaching tank to adjust the pH to 10-12, and thereby to generate an ammine complex of a divalent or trivalent nickel ion and an anion complex of a tetravalent and/or pentavalent vanadium ion in the alkaline aqueous solution and corresponds to a complex generating means of the present invention. In the complex generating tank, a complex is generated according to the above-mentioned method described in steps 3 to 7.

The nickel recovery tank is a means for adding a carrier having a carboxyl group to an alkaline aqueous solution, in which the ammine complex and the anion complex are generated, to selectively adsorb nickel ions in the ammine complex onto the carrier, thus recovering the nickel ions, and corresponds to a nickel recovery means of the present invention. In the nickel recovery tank, nickel is recovered according to the above-mentioned method described in steps 7 to 10.

The vanadium recovery tank is a means for recovering vanadium from the anion complex contained in the alkaline aqueous solution after filtration separation, and corresponds to a vanadium recovery means of the present invention. In the vanadium recovery tank, vanadium is recovered according to the above-mentioned method described in steps 11 to 13.

4. Device for Producing Electrolytic Solution for Redox Flow Batteries

In a device for producing an electrolytic solution for redox flow batteries according to the present invention, vanadium obtained in the above-described vanadium recovery device is used as a raw material for an electrolytic solution for the redox flow batteries. Namely, the device for producing the electrolytic solution according to the present invention includes a means for producing the electrolytic solution by the above-mentioned method described in "2. Method for Producing Electrolytic Solution for Redox Flow Batteries".

There will be described the present invention with reference to Examples. However, the object of the present invention is not construed to be limited by these descriptions.

1. Experimental Example 1 (Evaluation of Absorbability of Brown Coal)

Example 1

(1) Preparation of Brown Coal

Loy Yang brown coal (LY brown coal) produced in Australia was prepared and sieved to have a particle size of 45 to 75 μm. The obtained brown coal was subjected to an industrial analysis and elemental analysis. The results are shown in Table 1.

TABLE 1

| Industrial Analysis[wt %] | | | | Elementary Analysis[wt %, d.a.f] | | | | |
|---|---|---|---|---|---|---|---|---|
| Moist. | V.M. | Ash | F.C.$_{\cdot diff}$ | C | H | N | S | O$_{diff}$ |
| 13.5 | 40.9 | 1.0 | 44.7 | 68.5 | 4.8 | 0.6 | 0.3 | 25.8 |

(2) Preparation of Sample (Simulated Waste Catalyst)

Nickel oxide (NiO), vanadium oxide ($V_2O_5$) and iron oxide ($Fe_2O_3$) (each produced by Wako Pure Chemical Industries, Ltd.) each of 33.3 wt % were introduced into a mortal and kneaded while adding water. After the kneaded mass was formed into a ball, thus formed ball was dried and ground to regulate a particle size to 45 to 75 μm, thus preparing a simulated catalyst. An amount of the mixture was changed to prepare six samples having nickel contents of 0.5 mmol, 1.0 mmol, 1.5 mmol, 2.0 mmol, 2.5 mmol, and 3.0 mmol per 1 g of brown coal.

(3) Leaching-Alkaline Treatment)

50 ml of 3M sulfuric acid was added to 1.4 g of the resultant simulated waste catalyst and stirred at 300 rpm at 80° C. for 4 hours to perform leaching. Thereafter, 120 mmol of 28% ammonia water was added to the leach liquid to adjust pH to 10.5. The precipitate was filtered to remove iron hydroxide ($Fe(OH)_3$), thus obtaining the carried liquid.

(4) Carrying onto Blown Coal 5 g of LY brown coal and 150 ml of the carried liquid were mixed and stirred for 1 hour. The brown coal was sanction-filtered off and washed followed by vacuum drying at a temperature of 107° C. in a nitrogen atmosphere for 12 hours. The resultant metal-carried coal was burned in a Muffle furnace at a temperature of 815° C. in the presence of air for 1 hour to ash the metal-carried coal.

(5) Analysis and Result

The resultant combustion ash was subjected to quantitative analysis by means of an energy dispersive X-ray fluorescence spectrometer (EDX-700/800: produced by Shimadzu Corporation). The results are shown in FIG. 5.

FIG. 5 is a graph showing a relationship between an amount of metal [mmol/g] per 1 g of brown coal, contained in an ion adsorption target liquid, and metal adsorption rate. This graph is obtained by plotting metal carrying rates (%) to the nickel contents of 0.5 mmol, 1.0 mmol, 1.5 mmol, 2.0 mmol, 2.5 mmol, and 3.0 mmol in the ammoniac alkaline aqueous solution per 1 g of brown coal. This figure is a graph in which X axis is for nickel content (mmol/g) and Y axis for rate (wt %) of nickel carrying amount to brown coal amount. As a result, the nickel carrying rate increases in the range of 0.5 to 2.0 mmol/g of nickel content in the ammoniac alkaline aqueous solution and converges to about 8.8% in the range of 2.0 mmol/g or more of nickel content. For that reason, it is seen that 1 g of brown coal is preferably added to the carried liquid containing nickel of 2.0 mmol/g or more.

2. Experimental Example 2 (Recovery of Nickel from Nickel-Vanadium Mixed Solution)

(1) Example 2 (Nickel/Vanadium Mixture System)

Sample A having a nickel content of 3.0 mmol per 1 g of brown coal was prepared in the same manner as in Experimental Example 1. Nickel nitrate (II) hexahydrate (produced by Wako Pure Chemical Industries, Ltd.) was used as a reagent and an ion exchange water was added to the reagent to dissolve it in the ion exchange water in the same manner as in Experimental Example 1. Further, sample B having a vanadium content of 3.0 mmol per 1 g of brown coal was prepared. Specifically, vanadium chloride (III) hexahydrate (produced by Mitsuwa Chemicals Co., Ltd.) was used as a reagent and an ion exchange water was added to the reagent to dissolve it in the ion exchange water in the same manner as in Experimental Example 1.

Subsequently, sample A and sample B were mixed in a weight ratio of 1 to 1 and dissolved in 300 ml of an ion exchange water in the presence of excess $H_2O_2$ in a normal temperature (Example 2). Then, metals were adsorbed to brown coal in the same manner as in item (4) "Carrying on Blown Coal" and item (5) "Analysis and Result" in "1. Experimental Example 1". Carrying rates of nickel and vanadium were measured respectively. As a result, it was seen that the carrying rate of nickel was 5.1% and the carrying rate of vanadium was 0.0056%. The adsorption rates of nickel and vanadium were calculated from thus obtained carrying rates of nickel and vanadium. The results are shown in Table 2. Units of numerical values are atomic weight (mol %).

Adsorption rate of nickel=[Carrying rate of nickel/(Carrying rate of nickel+Carrying rate of vanadium)]×100

Adsorption rate of vanadium=[Carrying rate of vanadium/(Carrying rate of nickel+Carrying rate of vanadium)]×100

(2) Comparative Example 1 (Single Metal System of Nickel and Vanadium)

Only sample A (nickel) was dissolved in 300 ml of an ion exchange water at a normal temperature. Further, only sample B (vanadium) was dissolved in 300 ml of an ion exchange water at a normal temperature in the presence of excess $H_2O_2$. Then, metals were adsorbed onto brown coal in the solution of sample A and in the solution of sample B, respectively, in the same manner as in item (4) "Carrying on Blown Coal" and item (5) "Analysis and Result" in "1. Experimental Example 1", and carrying rates of metals were measured. As a result, it was seen that the carrying rate of sample A (nickel) was 5.1% and the carrying rate of sample B (vanadium) was 0.3%. Then, on the basis of the obtained carrying rates of sample A and sample B, the comparison values of the adsorption rates of nickel and vanadium on the assumption that both the samples were simply mixed, were calculated from the following equations. The results are shown in Table 2. Units of numerical values are atomic weight (mol %).

Adsorption rate of nickel(comparison value)=[Carrying rate of nickel in sample A/(Carrying rate of nickel in sample A+Carrying rate of vanadium in sample B)×100

Adsorption rate of vanadium(comparison value)= [Carrying rate of vanadium in sample B/(Carrying rate of nickel in sample A+Carrying rate of vanadium in sample B)×100

TABLE 2

|  | Adsorption rate of nickel (mol %) | Adsorption rate of vanadium (mol %) |
|---|---|---|
| Example 2 (V:Ni = 1:1) | 99.89 | 0.11 |
| Comparative Example 1 (single metal system: comparison value) | 94.5 | 5.5 |

From these results, it is seen that the adsorption rate of nickel (Example 2) in the mixture system of nickel and vanadium is higher than the adsorption rate of nickel (Comparative Example 1) in the single metal system of nickel and vanadium in which each metal is adsorbed to brown coal. Namely, the adsorption rate of nickel determined in the mixture system of metals is higher than the comparison value of the adsorption rate determined in the single system of each metal. This represents that when nickel and vanadium are mixed, nickel is selectively adsorbed onto brown coal compared to vanadium. Therefore, it is seen that when nickel and vanadium are allowed to coexist, nickel is advantageously adsorbed and can be selectively recovered.

Furthermore, as described above, the carrying rate of nickel in nickel sulfate (II) in Experimental Example 1 is 8.8% and the carrying rate of nickel in nickel nitrate (II) is 5.1%. From this result, it is seen that the adsorption rates of divalent metal in metal sulfate and metal nitrate onto the carrier are as high as 5% or more.

INDUSTRIAL APPLICABILITY

The present invention is useful for fields of extraction and recycling in which vanadium is selectively recovered from a metal mixture containing at least nickel and vanadium.

The invention claimed is:

1. A method for recovering vanadium from a metal mixture at least containing vanadium and at least one divalent or trivalent metal selected from nickel, cobalt, manganese, palladium, platinum, copper and zinc, which comprises:

an acid leaching step for leaching the metal mixture with an acid to obtain a leach liquid;

a complex generating step for adding an ammoniacal alkaline aqueous solution to the leach liquid to adjust the pH to 10-12 and generating an ammine complex of a divalent or trivalent metal ion and an anion complex of a tetravalent and/or pentavalent vanadium ion in the alkaline aqueous solution;

a divalent or trivalent metal recovery step for adding a carrier having a carboxyl group to the alkaline aqueous solution in which the ammine complex and the anion complex are generated, causing the divalent or trivalent metal ion in the ammine complex to be selectively adsorbed onto the carrier, and recovering the divalent or trivalent metal ion; and a vanadium recovery step for recovering vanadium from the anion complex contained in the alkaline aqueous solution after the divalent or trivalent metal ion is recovered.

2. The method for recovering vanadium according to claim 1, wherein the vanadium recovery step comprises adjusting the pH of the alkaline aqueous solution to 8 to 9.5 to precipitate the anion complex, filtration-separating the anion complex, and roasting the anion complex in air to recover vanadium oxide.

3. The method for recovering vanadium according to claim 1, wherein the vanadium recovery step comprises adjusting the pH of the alkaline aqueous solution to 8 to 9.5 to precipitate the anion complex, filtration-separating the anion complex, heating the anion complex in an atmosphere of nitrogen until an ammonia content in the anion complex evaporates, and adding sulfuric acid to recover tetravalent and/or pentavalent vanadium sulfate.

4. The method for recovering vanadium according to claim 1, wherein the carrier is coal.

5. A method for recovering vanadium according to claim 1, wherein the recovered vanadium is vanadium oxide ($V_2O_5$).

6. A method for producing an electrolytic solution for redox flow batteries comprising placing the vanadium recovered by the method according to claim 1 into solution.

7. A method for recovering vanadium according to claim 1, wherein the recovered vanadium is tetravalent and/or pentavalent vanadium sulfate.

* * * * *